United States Patent [19]

Melling et al.

[11] 3,890,128
[45] June 17, 1975

[54] METHOD OF TOUGHENING GLASS

[75] Inventors: Richard Melling, Ormskirk; Donald Curtis Wright, Bolton; John Pickup, Clyton-le-Mo Rs near Accrington, all of England

[73] Assignee: Pilkington Brothers Limited, Liverpool, England

[22] Filed: June 21, 1971

[21] Appl. No.: 155,234

Related U.S. Application Data

[63] Continuation of Ser. No. 802,151, Feb. 25, 1969, abandoned.

[30] Foreign Application Priority Data

Feb. 27, 1968 United Kingdom............... 9484/68

[52] U.S. Cl. .................. 65/116; 65/104; 65/348
[51] Int. Cl. ............................................ C03b 27/00
[58] Field of Search ............ 65/104, 116, 349, 350, 65/351, 348

[56] References Cited
UNITED STATES PATENTS
3,265,484  8/1966  Ritter, Jr.............................. 65/104

FOREIGN PATENTS OR APPLICATIONS
229,574  2/1944  Switzerland........................ 65/116

Primary Examiner—Arthur D. Kellogg
Attorney, Agent, or Firm—John P. Snyder

[57] ABSTRACT

Glass, e.g., of thickness in the range 0.75mm to 10mm, is toughened by severely quenching by contact with a quenching medium producing a high rate of heat transfer from the glass, following a preliminary cooling to establish a surface temperature and a centre-to-surface temperature difference such that deformation and fracture of the glass when it is severely chilled is obviated.

7 Claims, 5 Drawing Figures

PATENTED JUN 17 1975 3,890,128

SHEET 1

METHOD OF TOUGHENING GLASS

CROSS REFERENCE TO RELATED APPLICATION

This application is a continuation of copending application Ser. No. 802,151 filed Feb. 25, 1969 and now abandoned.

BACKGROUND OF THE INVENTION

This invention relates to the toughening of glass and more especially to the toughening of flat or bent glass articles for example glass for use as motor vehicle windscreens, side lights and rear lights and for use in the construction of aircraft windows.

Known methods of toughening glass entail chilling the glass rapidly from an elevated temperature to produce a glass article having an increased ultimate tensile strength, by creating compressive stress in the surfaces of the glass and a central tensile stress. Usually the chilling is effeted by directing a gaseous chilling medium at the surfaces of the glass. Difficulties have been experienced in obtaining a high degree of toughening in the glass and more particularly when toughening thinner glass, that is glass of 3mm thickness or less, because the rate of heat extraction from the glass surfaces by conventional air quenching is insufficient to produce a satisfactory compressive stress.

The present invention is based on the discovery that toughened glass with a high ultimate tensile strength can be produced by quenching the glass with a chilling medium which is capable of extracting heat from the glass surfaces at a high rate, as long as there has been a preliminary cooling of the glass to bring the glass to a state in which it can be severely quenched by the chilling medium without damage to the glass.

A main object of the present invention is therefore to provide an improved method of toughening glass in which there is a high rate of heat transfer from the glass in a quenching step in which the hot glass is severely chilled, for example with a liquid medium, while in a first step there is a preliminary cooling of the glass to prepare the glass for the severe chilling.

SUMMARY

According to the invention there is provided a method of toughening glass in which glass at a temperature near to its softening point is subjected to a preliminary cooling by contacting the surfaces of the hot glass with a cooling medium which cools the glass at a controlled rate and for a time to establish in the glass a surface temperature and a centre-to-surface temperature difference such that deformation of the glass surfaces and fracture of the glass are obviated on subsequent severe chilling of the glass, and immediately severely quenching the surface-cooled glass by contact with a quenching medium producing a high rate of heat transfer from the glass.

Preferably the desirable condition of the glass is achieved in the preliminary cooling step by reducing the glass surface temperature to a value such that the deformation of the surfaces on subsequent severe chilling is avoided, while maintaining the core of the glass at a temperature near said initial temperature, and then immediately severely quenching the surface-cooled glass.

Generally the surface temperature of the glass is lowered to a temperature at or above the upper limit of the annealing range.

The severe quenching of the surface-cooled glass with a quenching medium which produces a high rate of heat transfer from the glass, can be achieved using a solid or a liquid quenching medium. It is preferred that a chilling liquid be employed thereby achieving intimate contact with the whole of the glass surfaces. From this aspect the invention provides a method of toughening glass in which glass at an initial temperature near to its softening point is subjected to a preliminary cooling by contacting the surfaces of the hot glass with a cooling medium which cools the glass surfaces at a controlled rate for a time to reduce the glass surface temperature to a value such that deformation of the surfaces on subsequent immersion in a chilling liquid is avoided, while maintaining the core of the glass at a temperature near said initial temperature, and immediately immersing the surface-cooled glass in a chilling liquid to complete the toughening of the glass.

However, solid contact quenching can also be employed advantageously. The glass may be quenched while it is still hot after forming. Alternatively the method of the invention includes the step of heating the glass to an initial temperature near its softening point prior to the preliminary cooling step. When toughening an article of soda-lime-silica glass, the glass is heated to an initial temperature in the range 620° to 760°C and the preliminary cooling brings the glass surface temperature down to a temperature in the range 560° to 640°C while maintaining the core of the glass at a temperature near the initial temperature of the glass.

The method of the invention can be carried out on individual sheets of glass treated one at a time or in a continuous or semi-continuous process in which glass articles follow each other through the process. The invention thus provides a method of toughening flat glass comprising heating the glass to an initial temperature near to its softening point, advancing te glass along a predetermined path leading to a quenching station where the glass is in contact with a chilling liquid, subjecting the surfaces of the hot glass to streams of cool gas immediately prior to contact with the chilling liquid, which gas streams establish a centre-to-surface temperature difference in the glass while maintaining the core of the glass near to the initial temperature of the glass, immediately immersing the surface-cooled glass in a chilling liquid, and controlling the speed of the glass as it passes between said cooling gas streams and while it comes into contact with the chilling liquid.

The method may be vertically oriented with a vertical oven, blowing frames and a quenching tank vertically disposed, the quenching bath of chilling liquid being disposed immediately below the region where the streams of cool gas are effective to carry out the preliminary cooling of the glass surfaces.

While it is preferred to use cool gas streams for the preliminary cooling of the glass the first cooling medium may be a liquid spray directed symmetrically at the glass surfaces, for example a water spray.

The method can be applied to the toughening of a wide range of glass thicknesses, for example very thin glass even thinner than 2mm e.g., down to 0.75 mm and particularly 0.8 mm and 1 mm glass; and glass which is thicker than 6mm, for example 8mm and 10mm glass.

The invention is particularly applicable to the toughening of soda-lime-silica glass of thickness in the range 0.75mm to 10mm, by a method comprising heating the glass to a temperature near its softening point, passing the glass at a constant speed between cool gas streams for a time sufficient to cool the glass surfaces to a temperature in the range 560° to 640°C, and immediately immersing the glass at that speed in a chilling liquid to toughen the glass.

In this method the preliminary cooling of the glass takes place while it is moving at the same uniform speed as is maintained when the glass is quenched into the chilling liquid but in some methods according to the invention the speed of the glass as it undergoes preliminary cooling may be different from that at which the glass enters the quenching liquid as long as constancy of speed is maintained in each of these stages.

The quenching liquid which is used in the second and severe quenching step preferably has a heat transfer coefficient with respect to the glass in the range 0.0035 to 0.06. The liquid may be an oil, for example a lubricating oil or vegetable oil. In some circumstances a molten metal, for example molten tin or molten tin alloy may be used.

Sheets of bent toughened glass can be produced by the method of the invention by heating a sheet of flat glass to a temperature near to its softening point, and bending the sheet to a desired curvature prior to subjecting the sheet to the preliminary cooling.

It has been found that the central tensile stress in the toughened glass can be predetermined to some extent by the initial temperature of the glass for a given set of preliminary cooling conditions and for a given speed of the glass through the preliminary cooling and during its quench, it has been discovered that the central tensile stress induced in the glass can be varied by from 70 kg/cm² to 90 kg/cm² for every 10°C difference in the initial temperature of the glass.

The invention also includes toughened glass produced by a method as described above. More particularly the invention provides toughened flat glass of homogeneous composition whose thickness is in the range of 0.75 mm to 10 mm, having distortion-free surfaces, an ultimate tensile strength in the range 1,260 kg/cm² to 4,350 kg/cm² and central tensile stress in the range 420 kg/cm² to 1,120 kg/cm².

More particularly the invention provides a new toughened thin glass, 2 mm thick which has ultimate tensile strength in the range 1,260 kg/cm² to 2,800 kg/cm², and central tensile stress in the range 420 kg/cm² to 1,120 kg/cm².

A sheet of such thin toughened glass can be incorporated in a laminated glass unit for example a laminated glass windscreen comprising two sheets of glass laminated together with a layer of transparent plastics material, at least one of the glass sheets being a sheet of toughened glass 0.75 mm to 3 mm thick as just described.

As well as toughening thin glass the invention may equally be applied to the toughening of 6mm glass which when toughened has ultimate tensile strength in the range 2,450 kg/cm² to 4,350 kg/cm² and central tensile stress in the range 700 kg/cm² to 1,120 kg/cm².

The invention also provides apparatus for toughening glass comprising means for engaging and advancing glass at a controlled speed from a heating station operable to heat the glass to a temperature near to its softening point, a preliminary cooling station associated with said glass advancing means, including means for contacting the hot glass surfaces with a cooling medium which cools the glass at a controlled rate and for a time to establish in the glass a surface temperature and a centre-to-surface temperature difference such that deformation of the glass surfaces and fracture of the glass are obviated on subsequent severe chilling of the glass, and a quenching station located contiguous to said cooling station including means for bringing a quenching medium producing a high rate of heat transfer from the glass into intimate surface contact with the glass advanced thereinto from said preliminary cooling station.

Further in one apparatus for carrying out the invention there are provided means for holding glass to be toughened, guides for engagement by said holding means, and extending from an oven to a quenching tank for holding a chilling liquid, blowing frames located between the oven and the quenching tank and immediately adjacent the quenching tank, and driving means for moving said glass holding means along the guides at a uniform speed, whereby hot glass is advanced at a controlled uniform speed between the blowing frames and immediately quenched in the chilling liquid.

A preferred apparatus according to the invention comprises a vertical oven with an open bottom, glass engaging tongs suspended from a tong bar in the oven, runners on the tong bar which engage on guide rails extending downwardly from the oven past the blowing frames to the quenching tank, and lowering means attached to the tong bar for lowering the tong bar at a uniform speed down the guide rails.

For the production of curved toughened glass sheets a pair of bending dies may be interposed between the bottom of the oven and the top of the blowing frames, and the blowing frames shaped to match the curvature of the bending dies.

DESCRIPTION OF THE PREFERRED EMBODIMENTS

Figure 1:
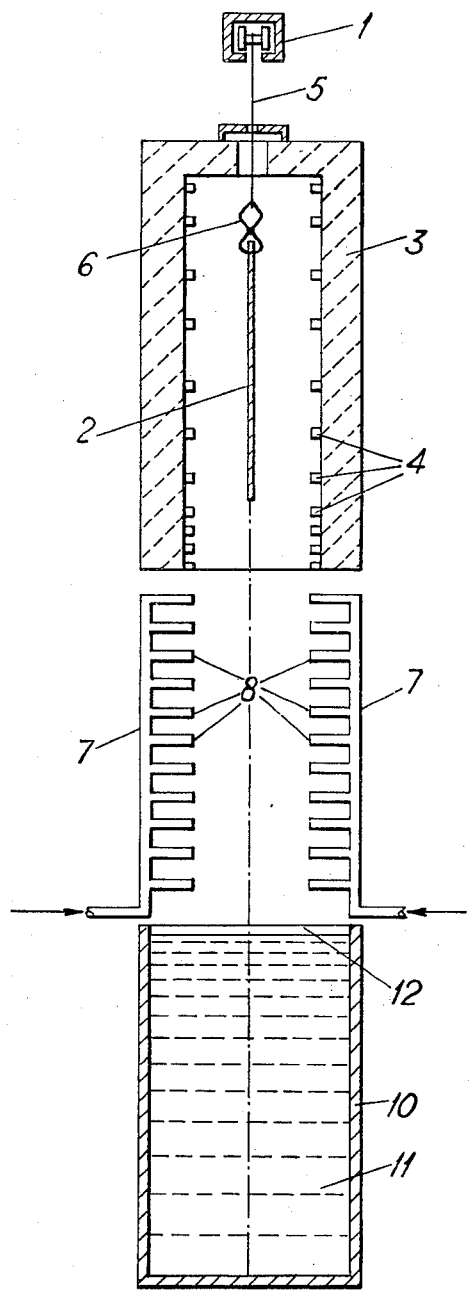
FIG. 1 illustrates diagrammatically a vertical section through apparatus according to the invention for use in toughening glass sheets.

Referring to FIG. 1 of the drawings a horizontal conveyor 1 is shown diagrammatically for conveying glass in the form of flat sheets 2 horizontally through a side opening into a vertical oven 3 which has vertical side walls in which electrical heating elements 4 are mounted. The glass sheet 2 is suspended near its upper edge by tongs 6 in known manner, and the tongs 6 are suspended from the conveyor by cables 5, only one of which is shown, which cables are connected to a lowering winch which is illustrated in more detail in FIGS. 2 and 3. The operation of the winch is controlled so that the glass sheet can be lowered rapidly at a controlled constant speed.

In the vertical oven 3 the heating elements 4 heat the glass sheet to an elevated temperature near to the softening point of glass. Typically when toughening sheets of flat glass of soda-lime-silica composition the glass is heated to about 690°C. Higher temperatures may be employed, for example the temperature of the glass may be taken up to 760°C. In some instances where a lesser degree of toughening is required the initial temperature to which the glass is heated may be as low as 620°C.

The bottom of the oven 3 is open so that the heated glass sheet can be lowered quickly from the oven, and a door or doors may be provided at the oven bottom in known manner. There is a concentration of heating elements 4 at the bottom of the oven to assist in maintaining uniformity of heating of the glass through its whole height, and to produce a seal of hot gas at the open lower mouth of the oven which gas is at a temperature higher than the gas which fills the rest of the oven. Typically the temperature at the open lower end of the oven 3 may be of the order of 790°C. If this hot gas seal is effective doors may not be required closing the oven bottom.

Immediately below the open lower mouth of the oven 3 there are arranged two vertical blowing frames. These frames are identical and are mounted equidistantly on either side of the vertical path of the glass sheet 2 as it is lowered from the oven. Each of the blowing frames has a staggered array of nozzle outlets 8, and the nozzles of the frames are staggered relative to each other so that the nozzles of either frame do not point towards the nozzles of the other frame. Both arrays of nozzles are connected to a source of cooling gas, usually compressed air, at ambient temperature.

In the embodiment illustrated in FIG. 1 the vertical height of the blowing frames is slightly greater than the vertical height of the glass sheet 2, and is so related to the speed of lowering of the glass sheet that the hot glass sheet undergoes an accurately controlled preliminary cooling, to be described in greater detail below, as it is lowered at uniform speed between the blowing frames 7.

During its passage between the blowing frames the temperature of the glass surfaces is lowered to a temperature at which deformation of the glass surfaces and fracture of the glass are obviated on subsequent contact with a chilling liquid which effects a severe chilling of the glass. For example when toughening ordinary soda-lime-silica glass the surfaces of the glass are cooled to a temperature in the range 560° to 640°C. The rapid passage between the blowing frames, while producing this substantial cooling of the glass surfaces, leaves the centre of the glass sheet at a temperature close to the temperature it attained in the heating furnace 3, so that as the glass passes below the bottom of the blowing frames there is a definite temperature difference, for example from 60° to 120°C, between the centre and the surfaces of the glass. This is found to give a steep temperature gradient in the surface regions of the glass.

A quenching tank 10 containing a bath 11 of a chilling liquid is mounted immediately below the bottom of the blowing frames. The apparatus is arranged so that the bottom nozzles 8 of the blowing frames 7 are as close as possible to the surface 12 of the bath of chilling liquid so that as the glass leaves the ambience of the cooling air directed at its surfaces by the blowing frames 7, it is immediately immersed in the chilling liquid 11. The depth of the bath 11 is greater than the vertical height of the glass sheet 2.

The chilling liquid in the bath 11 has a heat transfer coefficient with respect to the glass of between 0.0035 and 0.06 calories, $cm^{-2}$. $°C^{-1}$. $sec^{-1}$. As is well known the heat transfer coefficient defines the rate of heat transfer between the glass and the liquid chilling medium per unit temperature difference per unit area.

Suitable chilling media are for example oils and some low melting point metals and alloys. Vegetable oils, castor oil, cooking oil, transformer oil and light heat transfer oil, has been used successfully, as well as the following commercial oils:

Castrolite
B.P. Viscostatic 20/50
Castrol Iloquench Nos. 2, 3, 4, 6, 7, 8 and 32
Mobil Cylrex
Duckhams Adquench Nos. 3 and 10
Duckhams Adtherm 12/2
Shell Vitrea 79
Shell Voluta 50
Shell Talpa
Velvene S.A.E. 10, 20 and 30.

Molten tin and tin alloys, e.g., tin/lead and tin/bismuth alloys have been used up to a temperature of about 400°C. When using molten metals, and when using a high blowing pressure at the blowing frames it is preferable to maintain an inert, or slightly reducing, atmosphere surrounding the quenching bath, e.g., nitrogen or nitrogen with 5 percent hydrogen. This atmosphere may be suplied as the cooling gas to the blowing frames.

The temperature of the bath does effect the stress induced in the toughened glass, and is held at a desired temperature by temperature regulators.

It has been found preferable that the temperature of the bath, when using oil, shall be between ambient tmeperature and about 60°C.

In carrying out the method of the invention the glass sheet 2 to be toughened is heated in the oven 3 to a temperature near its softening point, for example 720°C when the glass sheet is a sheet of soda-lime-silica glass, and the glass is then lowered rapidly at a constant speed in the range for example of 10 to 20 cms per second and passes between the blowing frames 7 where cool gas impinging on the opposite faces of the glass sheet effects a preliminary chilling of the surfaces of the sheet to a temperature within the range 560° to 640°C. The amount of surface chilling of the glass can be varied by adjusting the volume flow of the chilling gas against the glass surfaces and the rate of lowering of the glass between the blowing frames.

In a usual way of operating, any point on the glass takes about 1 second to pass between the blowing frames and the glass is lowered continuously, preferably at the same constant speed from the blowing frames into the quenching bath. It is possible however that the speed of lowering of the glass may be changed rapidly as the top edge of the glass leaves the blowing frames and before the lower edge reaches the quenching liquid, so that the glass undergoes its preliminary cooling as it passes at one constant speed between the blowing frames and enters the surface of the chilling liquid as it is quenched at a second different speed.

The high rate of heat transfer from the glass to the chilling liquid as it is immersed in the bath 11 ensures immediate quenching of the surface-cooled glass as the glass surfaces come into contact with the liquid.

After quenching the cool glass sheet is lifted from the bath 11 and conveyed to a washing station and is then released from the tongs.

In a more continuous process for the toughening of glass sheets in succession, each quenched glass sheet is moved out of its vertical path while still in the quenching bath to make way for the quench of a succeeding sheet, and is then lifted out of the bath and conveyed to the washing station.

Figure 2:
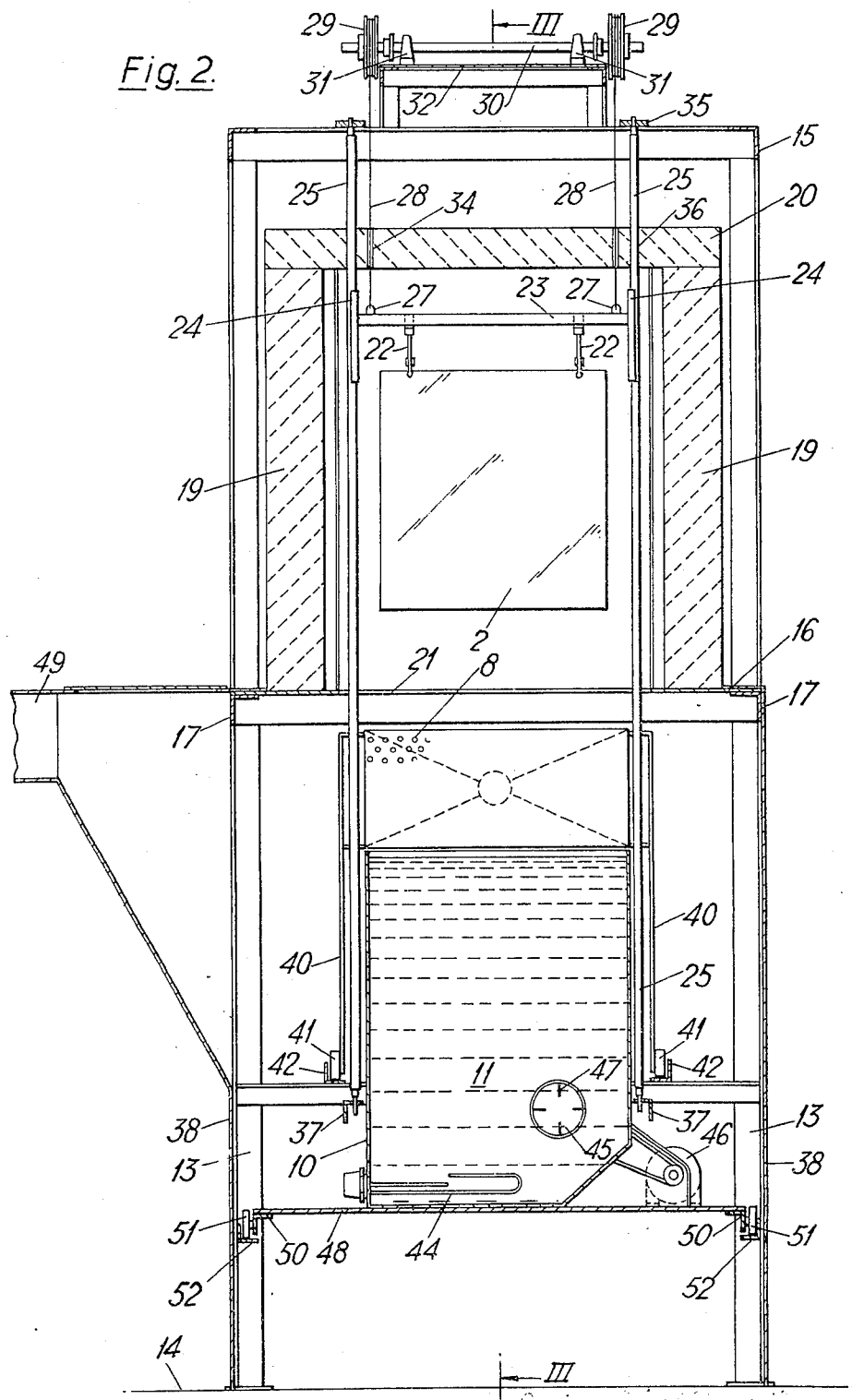
FIG. 2 is a sectional elevation through a practical form of the apparatus of FIG. 1.
Figure 3:
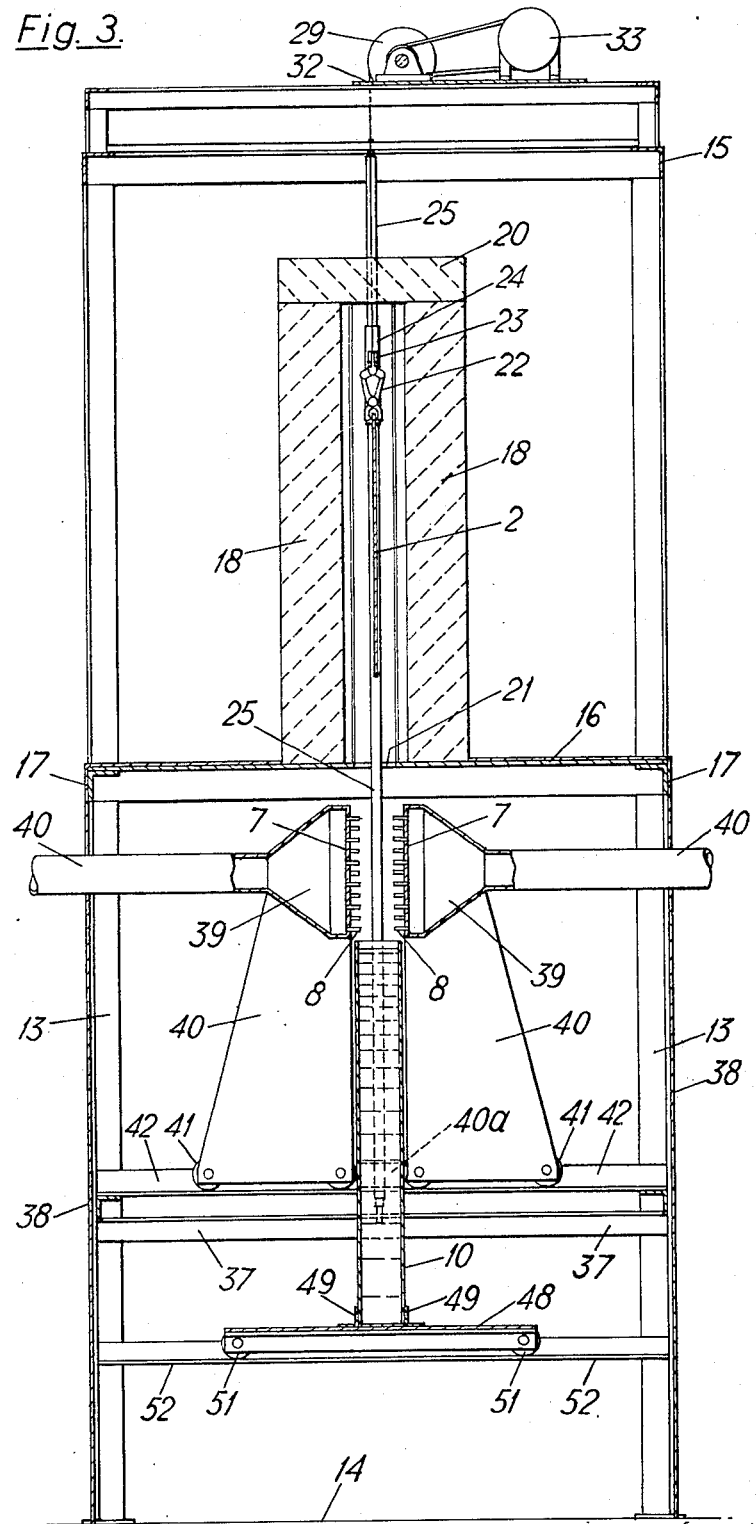
FIG. 3 is a section line III—III of FIG. 2.
Figure 4:
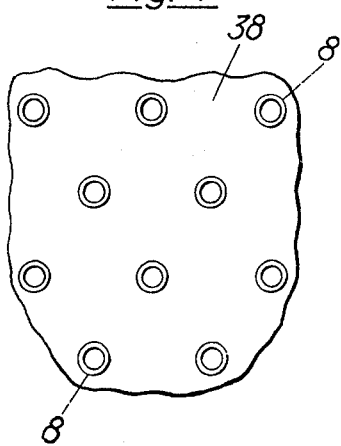
FIG. 4 illustrates an array of nozzles on one of the blowing frames employed in the apparatus of FIGS. 2 and 3.

A practical embodiment of the apparatus of the invention is illustrated in FIGS. 2 to 4.

As shown in FIGS. 2 and 3 corner stanchions 13 are mounted on the shop floor 14 and the tops of the stanchions are connected together by a rectangular frame 15.

Extending between the corner stanchions about half way up the apparatus there is an apertured plate 16 lying on cross-beams 17 which are fixed between the stanchions 13. The plate 16 forms the base plate of a vertical toughening oven having side walls 18, and walls 19, and a roof 20. The walls 18 and 19 and the roof 20 are made of usual refractory material and the bottom of the oven is open, the bottom outlet of the oven being defined by a central, elongated aperture 21 in the base plate. This outlet may be closed by flap doors of known construction, not shown. In the example illustrated the vertical oven is of elongated form for the uniform heating of a sheet of flat glass.

The sheet of glass 2 to be toughened is suspended in the oven by tongs 22 which grip the upper margins of the sheet. The tongs 22 are suspended from a tong bar 23 which extends between hemi-cylindrical runners 24 which run on guide rails 25.

The runners 24 are fixed to the ends of the tong bar 23.

There is a lug 27 near each end of the tong bar which is suspended by wire ropes 28 fixed to the lug 27, and wound around winding drums 29 which are mounted near either end of a common axle 30 which runs in bearings 31 fixed to a support plate 32 mounted above the top frame 15 of the apparatus. The drums are driven by an electric motor 33 and the speed of the motor 33 is controlled to control accurately the uniform speed of unwinding of the wire ropes 28 from the drums 29 and so the constant rate of descent of the glass sheet through and from the oven. The wire ropes 28 pass through holes 34 formed through the roof 20 of the oven. These holes are just big enough to allow passage of the wire ropes without too great a loss of heat from the oven.

The electric heating elements 4 are not shown in FIGS. 2 and 3, but as in FIG. 1 are mounted in the sides of the oven.

The guide rails 25 are steel rods of circular cross-section and are fixed at their upper ends to cross-beams 35 which extend across the frame 15 at the top of the apparatus. The guide rails are fixed into holes 36 in the oven roof 20 and extend down through the oven. At their lower ends the guide rails 25 are fixed to brackets 37 which are themselves fixed to the sides of the tank 10.

The lower part of the apparatus is enclosed by side plates 38.

Mounted just below the base plate 16 of the oven are a pair of blowing frames 7 each backed by a plenum chamber 39 to which a supply duct 40 is connected. Each of the blowing frames 7 with its plenum chamber 39 is supported between side brackets 40 which have wheels 41 fixed to the plates near their lower ends. These wheels run on rails 42 which are fixed at their ends to cross beams extending between the stanchions. A spacer block 40a is mounted centrally on the rails 42 to limit the inward movement of the blowing frames so that they are accurately positioned equidistantly on either side of the path of descent of the glass sheets. By means of this arrangement the blowing frames can be moved individually so that they are accurately and symmetrically spaced on either side of the path of descent of the glass sheet 2 defined by the guide rails 25, and both surfaces of the hot glass sheet receive the same preliminary cooling treatment as the sheet is lowered at constant speed between the blowing frames. The face of each blowing frame is constituted by a symmetrical array of staggered rows of blowing nozzles 8 as indicated in FIGS. 2 and 3 and illustrated in greater detail in FIG. 4. Each nozzle has an internal diameter of 3mm, and an external diameter of 6mm has been found particularly suitable. The nozzles extend outwardly from the face of the blowing frames by a distance of about 2.5 cm and the rows of nozzles are spaced apart by about 2 cm. When set up the ends of the nozzles are preferably about 3.8 cm from the path of descent of the glass surfaces, and the frames are constructed so that the nozzles do not face each other.

Cooling gas, usually air, is supplied through the ducts 40 at a pressure in the range 30 to 50 cm of water gauge and this ensures a rate of flow of cooling gas from the nozzles 8 which establishes the temperature gradient from the surface to the centre of the glass, that is cooling the glass surfaces to a temperature in the range 560° to 640°C, while maintaining the core of the glass at a temperature near its initial temperature, so that deformation of the glass surfaces and fracture of the glass are obviated on subsequent contact with the chilling liquid. The top of the blowing frames 7 is as near as possible to the mouth 21 of the oven so that on passing from the oven the glass immediately passes into the influence of the cooling air which escapes above the top of the blowing frame. The preliminary cooling of the glass thus starts without delay.

Immediately after leaving the blowing frames the glass is quenched by immersion in the chilling liquid 11. The quenching tank is of elongated shape to match the cross-section of the mouth 21 of the oven.

This chilling liquid, usually an oil as described above, fills the tank so that the surface 12 of the liquid is at the tip of the tank or as near as possible to the top while permitting the liquid to rise as the glass is quenched in the liquid.

The temperature of the liquid in the tank is controlled by an immersion heater 44 fixed in the bottom of the tank and by circulation of the liquid from the tank through an external cooler of known kind, not shown. A stirrer 45 is mounted in one of the side walls of the tank and is driven by a motor 46. The stirrer illustrated is a disc with radial vanes 47, and is operated to agitate the chilling liquid prior to the quenching of a sheet of glass.

The tank 10 is mounted on a support plate 48 and is fixed on that plate by angle bars 49 fixed to the plate 48. The plate 48 is mounted between side beams 50 on which wheels 51 are mounted. These wheels 51 run on rails 52 fixed between the side stanchions 13. This arrangement permits the quenching tank to be accurately located relative to the mouth 21 of the oven, the blowing frames 7, and the guide rails 25 to ensure that the quenching bath is correctly positioned to receive a hot glass sheet.

The guide rails 25 extend downwardly just outside the blowing frames 7 and the tank 10 and at the lower end of the path of travel of the tong bar 23, the tongs 22 are well immersed in the chilling liquid so that the sheet of glass is completely immersed before the tong bar 23 approaches the top edge of the tank 10.

Accurate control of the temperature of the chilling liquid is achieved by selective operation of the immersion heater 44 and the coling arrangement and when using an oil the temperature of the bath is preferably in the region between ambient temperature and 60°C.

The whole of the lower part of the apparatus beneath the oven base plate 16 is enclosed by the side plates 38 to form a chamber enclosing the blowing frames and the quenching tank 10. The gas supplied to the blowing frames and used as the preliminary cooling gas fills this chamber; an exhaust duct for this gas is provided through one side of the enclosure as indicated at 49. The exhaust duct 49 is connected to extract fan in known manner.

In this way an inert or slightly reducing atmosphere, e.g., nitrogen or a nitrogen/hydrogen mixture, can be effectively maintained around the quenching tank, although usually air is used as the gas for the preliminary cooling of the glass.

The stresses induced in the sheet of glass depend on the thickness of the glass, the inital temperature of the glass in the oven, the rate of cooling of the glass as it passes between the blowing frames, the speed of lowering of the glass throughout its whole path of travel, the temperature of the chilling liquid, and the nature of the chilling liquid. Some examples of the toughening of glass of different thicknesses in the range 0.8mm to 6mm will now be given.

In Examples I to XI in order to provide comparative figures, sheets of glass 25 cm square, and of different thicknesses, were heated to different temperatures in the illustrated apparatus and were all quenched in the same quenching liquid nnamely a bath of Castrol Iloquench No. 3.

EXAMPLE I

A sheet of soda-lime-silica glass 25 cms square and 2mm thick is suspended from the tongs 22 and heated in the oven to about 680°C. The temperature of the oven walls to achieve this temperature in the glass is about 750°C.

Castrol Iloquench 3 is used as the chilling liquid. The stirrer 45 is operated in the quenching tank and the temperature of the chilling liquid is controlled at about 45°C. When the glass sheet has reached the desired temperature the stirrer 45 is switched off, cooling air is supplied to the blowing frames, and the motor 33 is switched on to lower the glass sheet 2 at a controlled constant rate, of 15 cms per second. This constant speed is maintained throughout the lowering of the glass until it is completely immersed in the chilling liquid.

The blowing frames 7 are about 13 cms high and cool air is supplied to the blowing frames at a pressure of 35 to 40 cms. of water. The nozzle tips are maintained about 3.8 cm from the glass surface and the surface cooling of the glass as it passes between the blowing frames sets up a temperature difference of about 60°C between the centre and the surfaces of the glass. The temperature of the glass surfaces is about 620°c.

After immersion at the constant speed of 15 cms per second in the chilling oil, the glass remains in the tank for about 30 seconds and is then withdrawn and washed.

It was found that the 2mm thick glass had an ultimate tensile strength of 1,900 kg/cm² to 1,950 kg/cm² and a central tensile stress of 630 kg/cm². The surfaces of the glass were distortion free, any distortion of the hot glass on quenching in the chilling oil being obviated by the preliminary controlled surface cooling effected during the passage of the glass at uniform downward speed between the accurately and symmetrically located blowing frames.

EXAMPLE II

A similar sheet of glass 25 cms square and 2mm thick was heated in the oven to 660°C and lowered at 15 cm per second with the same preliminary cooling between the blowing frames into the same quenching bath of Castrol Iloquench 3 at 45°C, as in Example I. The preliminary cooling lowered the glass surface temperature to 600°C and the ultimate tensile strength of the glass was about 1,900 kg/cm² and the central tensile stress was about 420 kg/cm².

EXAMPLE III

A sheet of soda-lime-silica glass 25 cms square and 2mm thick was heated to 690°C amd was cooled to a lesser extent by supplying the cooling air to the blowing frames at a pressure of 30 cm of water. The glass was lowered at 25cm./sec., through the blowing frames into the bath of Castrol Iloquench 3 and it was found that the toughened glass had an ultimate tensile strength of 2,100 kg/cm² and a central tensile stress of 700 kg/cm².

EXAMPLE IV

A sheet of soda-lime-silica glass 25 cms square and 2mm thick was heated in the oven to 660°C and lowered at 15 cms per second between the blowing frames to which cooling air was supplied at a pressure of 30cm of water. On quenching in the bath of Castrol Iloquench 3 it was found that the ultimate tensile strength of the glass was 1,820 kg/cm² and the central tensile stress in the glass was 560 kg/cm².

EXAMPLE V

A sheet of soda-lime-silica glass 25cm square and 2mm thick was heated to 640°C and then lowered at 25cm per second between the blowing frames which were supplied with cool air at a pressure of 23cm water gauge. The preliminary cooling lowered the glass surface temperature to 580°C and the glass was immediately immersed in a quenching bath of Castrol Iloquench No. 3 at 45°C. The ultimate tensile strength produced in the glass was 1,820 kg/cm² and the central tensile stress was 560 kg/cm².

EXAMPLE VI

A sheet of soda-lime-silica glass 25cm square and 4mm thick was heated to 700°C and was cooled as it passed between the blowing frames at a speed of 15cm per second by streams of cooling air supplied at a pressure of 50cm water gauge. The surface temperature of the glass fell to 620°C while the core of the glass remained just below 700°C. After the preliminary cooling the glass was immediately quenched in the same quenching bath of Castrol Iloquench No. 3 of 45°C and the toughened glass produced had an ultimate tensile strength of 2,250 kg/cm² and the central tensile strength of 700 kg/cm².

EXAMPLE VII

A sheet of soda-lime-silica glass 25cms square and 6mm thick was heated to 700°C in the oven and the temperature of the chilling bath of Castrol Iloquench 3 was 40°C.

The glass sheet was lowered at uniform speed of 10cms per second and cool nitrogen was supplied to the blowing frames at a pressure of 100cm water gauge. After quenching it was found that the ultimate tnesile strength of the glass was 2,450 kg/cm² and the central tensile stress in the glass was 840 kg/cm².

EXAMPLE VIII

A similar sheet of 6mm soda-lime-silica glass was heated to 700°C and lowered at a uniform speed of 20cm per second. The cooling air was supplied to the blowing frames at a pressure of 70cm water gauge and after quenching in the bath of Castrol Iloquench 3 at 30°C the glass had an ultimate tensile strength of 3,350 kg/cm² and a central tensile stress of 840 kg/cm².

EXAMPLE IX

A sheet of soda-lime-silica glass 25cms square and 6mm thick was heated to 700°C, and the temperature of the chilling bath of Castrol Iloquench 3 was 30°C.

The speed of lowering of the glass was 15cms per second and cooling air was supplied to the blowing frames at a pressure of 70cm water gauge. The ultimate tensile strength of the quenched glass was 2,800 kg/cm² and the central tensile stress in the glass was 770 kg/cm².

EXAMPLE X

A sheet of glass 6mm thick and 25cm square was heated to 740°C and lowered at 25cm per second between the blowing frames which were supplied with cooling nitrogen at a pressure of 150cm water gauge. This lowered the surface temperature of the glass to 640°C and the glass was immediately quenched in the quenching bath of Castrol Iloquench 3. The ultimate tensile strength of the glass was 4,350 kg/cm² and the central tensile stress was 1,120 kg/cm².

Even thicker glass for example up to 8 mm or 10 mm thick can be toughened in a manner similar to Example X to produce a very high degree of surface compression in the highly toughened glass.

EXAMPLE XI

A sheet of very thin glass 25cm square and 0.8mm thick was heated to 700°C and lowered at about 40cm per second between the blowing frames which were supplied with cooling air at a pressure of 14cm water gauge. The surface temperature of the glass fell to 620°C while the core of the glass remained near to the initial temperature of 700°C and after quenching in the quenching bath of Castrol Iloqunch No. 3 at 45°C the thin glass sheet had an ultimate tensile strength of 1,700 kg/cm² and a central tensile stress of 560 kg/cm².

It is also possible to use molten metal, for example molten tin, as the quenching liquid and this is particularly effective for the toughening of very thin glass as illustrated in the following example.

EXAMPLE XII

A sheet of thin glass 25cm square and 0.8mm thick was heated to an initial temperature of 700°C and then lowered at a speed of 40cm per second between the blowing frames to which a cool mixture of nitrogen and hydrogen containing about 5 percent of hydrogen was supplied. The pressure of the slightly reducing atmosphere was about 13cm water gauge. The surface temperature of the glass fell to about 630°C while the initial temperature of the centre of the thin glass remained quite near to 700°C and the glass was then quenched immediately in a quenching bath of molten tin maintained at 300°C. The supplying of the slightly reducing atmosphere to the blowing frames meant that the bath of molten tin was maintained in a protective atmosphere which completely filled the enclosed space at the bottom of the apparatus.

The toughened thin glass produced had an ultimate tensile strength of 1,600 kg/cm² and a central tensile stress of 500 kg/cm².

These results indicate that the initial temperature of the glass is an important controlling factor and indeed it was deduced that the central tensile stress induced in the glass varied by about 84 kg/cm² for every 10°C difference in the initial temperature of the glass. Some additional control of the stress produced in the glass is achieved by variation in the speed of lowering of the glass and alteration of the blowing pressure at the blowing frames. Variation of these factors has some effect on the stress induced in the glass and can be considered as a fine adjustment of the process.

Curved glass sheets can be toughened by the process of the invention, thne blowing frames then being shaped to a curvature corresponding to the curvature of the glass sheets to be quenched. With the construction illustrated the blowing frames can be moved easily away from their operative position to change the frames when production is to change. The oil tank is of dimensions such that it can accommodate the usual curved glass sheets, for example curved windscreens.

Figure 5:
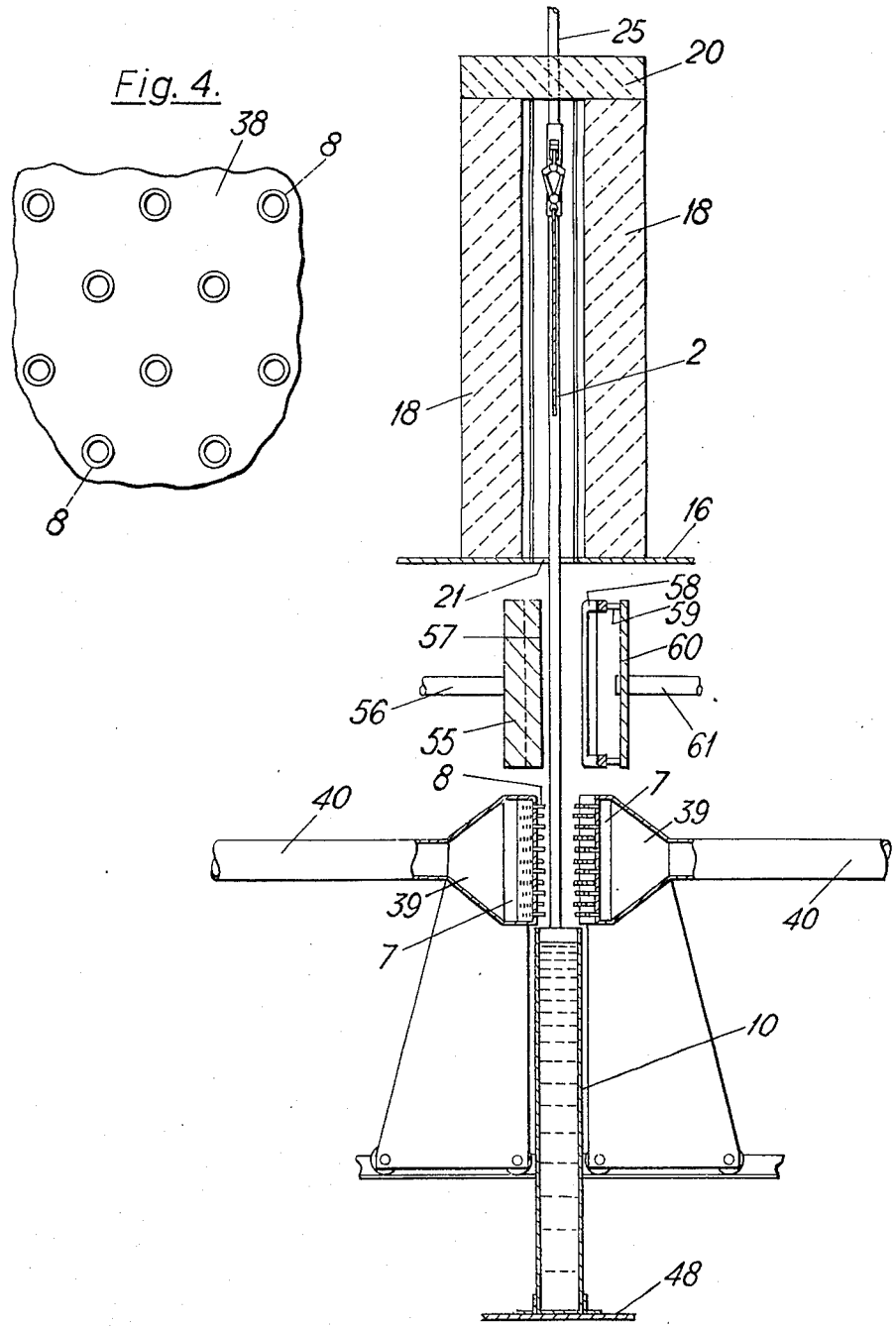
FIG. 5 illustrates diagrammatically the bending of sheets of flat glass prior to toughening by the method of the invention.

The invention can also be applied to the production of bent toughened sheets of glass from sheets of flat glass and this embodiment of the invention is illustrated in FIG. 5. Interposed between the bottom of the oven and the top of the blowing frames 7 there are a pair of bending dies positioned on opposite sides of the path of descent of the hot glass sheets. The bending dies comprise a contact block 55 supported on a ram 56 and having a curved front face 57 which defines the curvature to be imposed on the glass sheet. On the other side of the path of the glass there is a peripheral bending frame 58 which is carried by struts 59 on a backing plate 60 which is fixed to a ram 61. The curvature of the frame 58 matches the curvature of the block face 57.

These bending dies are closed about a hot glass sheet 2 which is temporarily arrested between the dies during its descent, and when bent passes immediately between the blowing frames 7.

In a usual manner the glass contacting surfaces of the dies are of a material which does not damage the glass, e.g., carbon or asbestos, even though the glass surfaces may be at a high temperature, for example 760°C.

The blowing frames 7 have curved surfaces matching the curvature of the bending dies and are otherwise of the same construction as illustrated in FIGS. 2 and 3 and are arranged to cool the surfaces of the curved glass sheet uniformly before it is immersed in the quenching bath.

The toughening process fothe invention may be carried out horizontally by employing a gas hearth to support the glass sheets both during the heating and preliminary cooling steps. Each glass sheet, whether flat or curved, is initially supported on a gas cushion which is formed between the glass sheet and the surface of a gas hearth through which gas is supplied to the supporting cushion and through which gas is exhausted from the cushion. Overhead heating elements are employed in combination with the effect of the hot gas supplied into the cushion to heat the glass initially and uniformly to the desired initial temperature.

The glass is advanced by edge contact during this initial heating and passes along the gas hearth to a preliminary cooling stage at which the gas support cushion is constituted by cooling gas and cooling gas is simultaneously directed, symmetrically with the gas support cushion, onto the upper surface of the glass to produce the initial surface cooling of the glass. Thereafter the glass is advanced immediately from the cooling stage into a state of complete surface contact with the chilling medium which may be in the form of a body of chilling liquid which is continuously supplied into intimate heat exchange contact with both surfaces of the hot glass to complete the quenching of glass. Thereafter the glass is advanced beyond the quenching station to a washing station and conveyed away.

AS described above the chilling medium which produces the high rate of heat transfer from the glass is preferably constituted by a liquid which is brought into intimate contact with the glass surfaces for example by immersion of the hot glass in the liquid. The desired quenching of the glass may also be achieved by contact quenching of the glass surfaces with solid surfaces of heat conducting material which extract heat rapidly and symmetrically from both faces of the glass. In place of the quenching tank 10 there may be provided contact chilling surfaces which are brought simultaneously into contact with both faces of the glass immediately after the whole of the glass sheet has passed from beneath the blowing frames.

The invention may be applied to the toughening of glass articles other than flat or curved sheets of glass for example glass containers or moulded glass articles such as glass insulators or hollow glass blocks or glass constructional members of specially shaped cross-section such as are employed in the building industry.

By the method of the invention it has been possible to produce much more highly toughened glass of ordinary soda-lime-silica composition than has been possible with toughening methods known hitherto. In particular the toughening of thin glass down to about 0.75 mm thickness to a high degree of stress without endangering the surface quality of the glass is an important advance which has not been possible hitherto.

What is claimed is:

1. A method of toughening a glass sheet in which the glass is quenched in a chilling liquid to toughen the glass after a preliminary cooling of the glass surfaces by means of a cooling gas, which comprises:

a. heating the glass sheet to a selected high temperature near to its softening point;
 b. effecting said preliminary cooling by passing the hot glass sheet at said selected high temperature at a selected rate of travel through a preliminary cooling region in which cooling gas flows are simultaneously directed against the opposite surfaces of the glass sheet uniformly over each surface at a flow rate sufficient
   i. to retain substantially said selected high temperature in the center of the glass sheet up to the time of quenching in said chilling liquid, and
   ii. to produce symmetrical temperature gradients from the center of the thickness of the glass sheet to both surfaces thereof sufficient to prevent deformation and fracture of the glass sheet as it is quenched in said chilling liquid; and
 c. quenching the glass in the chilling liquid immediately after said preliminary cooling before any substantial relaxation of said symmetrical temperature gradients takes place.

2. A method of toughening a glass sheet in which the glass is quenched in a chilling liquid to toughen the glass immediately after a preliminary cooling of the glass surfaces by means of a cooling gas, which comprises:

a. heating the glass sheet to an initial temperature in the range 620° to 760°C;
 b. effecting said preliminary cooling by passing the hot glass sheet at its initial temperature at a selected rate of travel through a preliminary cooling region in which cooling gas flows are simultaneously directed against opposite surfaces of the glass sheet uniformly over each surface at a flow rate sufficient
   i. to retain substantially said initial temperature in the center of the glass sheet up to the time of quenching in said chilling liquid, and
   ii. to cool the glass surfaces to a temperature in the range 560° to 640°C to produce symmetrical temperature gradients from the center of the thickness of the glass sheet to both surfaces thereof sufficient to prevent deformation and fracture of the glass sheet as it is quenched in said chilling liquid; and
 c. quenching the glass in the chilling liquid immediately after said preliminary cooling before any substantial relaxation of said symmetrical temperature gradients takes place to induce in the glass sheet a central tensile stress of at least about 420 kg/cm².

3. A method of toughening a glass sheet comprising:
a. suspending a glass sheet to be toughened from tongs;
b. heating the suspended glass sheet to a selected high temperature near to its softening point;
c. lowering the suspended glass sheet at said selected high temperature at a selected rate of travel through a preliminary cooling region in which cooling gas flows are simultaneously directed against the opposite surfaces of the glass sheet uniformly over each surface at a flow rate sufficient
   i. to retain substantially said selected high temperature in the center of the glass sheet during its passage through said preliminary cooling region, and
   ii. to produce identical temperature gradients from the center of the thickness of the glass sheet to both surfaces thereof sufficient to prevent deformation and fracture of the glass sheet as it is subsequently quenched in a chilling liquid; and d. lowering the suspended glass sheet from said preliminary cooling region immediately into a chilling liquid to quench the glass before any substantial relaxation of said temperature gradients takes place.

4. A method of toughening a glass sheet in which the glass is quenched in a chilling liquid to toughen the glass after a preliminary cooling of the glass surfaces by means of a cooling gas, which comprises:

a. heating the glass sheet to a selected high temperature near to its softening point; and then b. toughening the glass sheet by passing it while substantially at the temperature of step (a) throughout its mass at a selected rate of travel through a preliminary cooling region and immediately thereafter quenching it in a chilling liquid; said chilling liquid i. having a sufficiently high heat transfer coefficient with respect to said glass and ii. being maintained at a temperature sufficiently low with respect to the temperature of step (a), as would normally cause deformation and fracture of the glass sheet if directly quenched in said chilling liquid while substantially at the temperature of step (a); and said preliminary cooling being effected immediately preceding said quenching by directing cooling gas flow against the opposite surfaces of the glass sheet at flow rates sufficient i. to produce a reduced surface temperature of the glass sheet sufficient to prevent deformation and fracture of the glass sheet as it is quenched in said chilling liquid, ii. to retain substantially said selected high temperature in the center of the glass sheet up to the time of quenching while obtaining symmetrical and continually decreasing temperature gradients on either side of said center.

5. A method according to claim 1, wherein the chilling liquid has a heat transfer coefficient with respect to the glass of between 0.0035 and 0.06 $cm^{-2}.°C^{-1}.sec^{-1}$.

6. A method according to claim 1, including bending the sheet to a desired curvature prior to subjecting the glass to said preliminary cooling.

7. A method according to claim 1, of toughening a flat sheet of soda-lime-silica glass of thickness in the range 0.75 mm to 10 mm, comprising cooling both surfaces of the glass to the same temperature in the range 560° to 640°C in said preliminary cooling step.

* * * * *